N. HILKER.
MOP SQUEEZER OR WRINGER.
APPLICATION FILED JAN. 26, 1911.
1,009,308.
Patented Nov. 21, 1911.
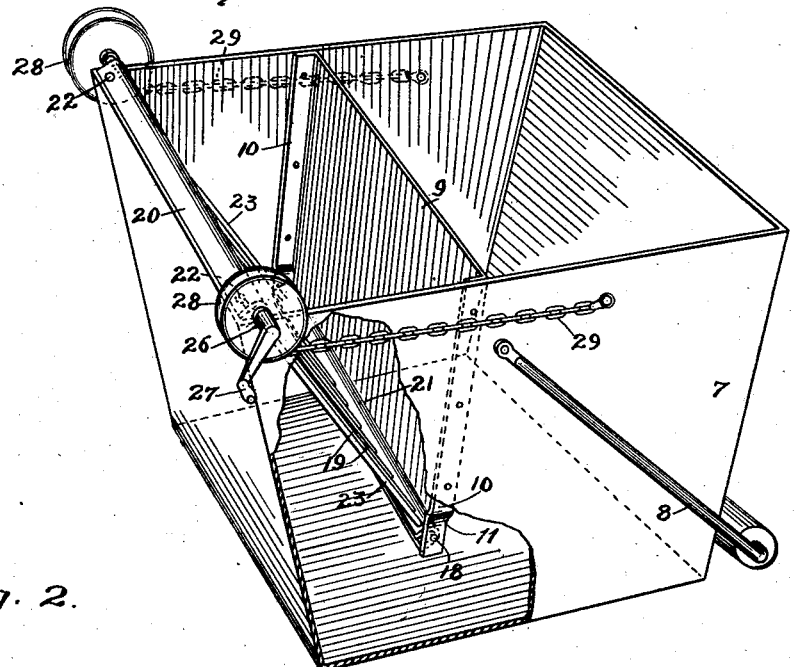
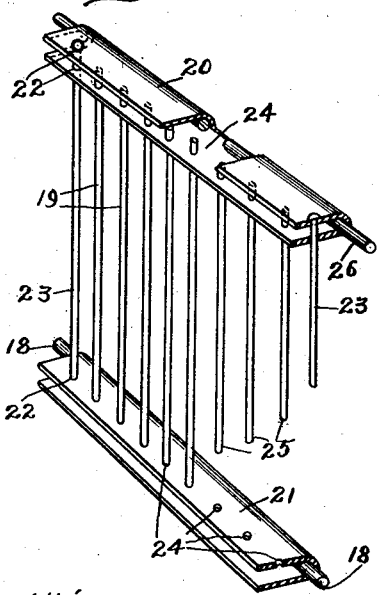
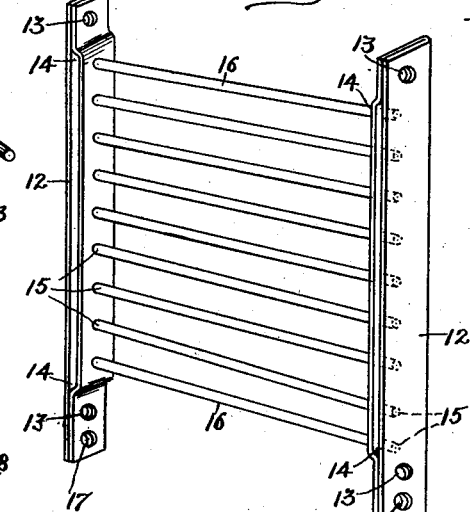
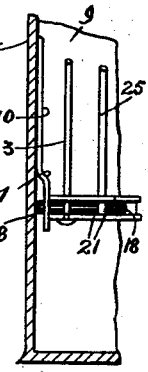
Witnesses:
Chas. E. Gorton.
E. Newstrom.
Inventor:
Nettie Hilker.
By Chas. C. Tillman
Atty.

UNITED STATES PATENT OFFICE.

NETTIE HILKER, OF COLORADO SPRINGS, COLORADO.

MOP SQUEEZER OR WRINGER.

1,009,308.            Specification of Letters Patent.     Patented Nov. 21, 1911.

Application filed January 26, 1911. Serial No. 604,727.

*To all whom it may concern:*

Be it known that I, NETTIE HILKER, a citizen of the United States, residing at Colorado Springs, in the county of El Paso and State of Colorado, have invented certain new and useful Improvements in Mop Squeezers or Wringers, of which the following is a specification.

This invention relates to improvements in an apparatus or device to be used for squeezing, pressing, or extracting water from cloth or fibrous substances, and is more particularly intended for use in squeezing mop-cloths as they hang from the mop-heads so as to remove the water therefrom and has for its principal object to improve and strengthen the construction as well as to simplify the assembling of the parts and to reduce the cost of manufacture.

With this and other objects in view, as will more fully hereinafter appear, the invention consists in certain novel features and combination of parts hereinafter described, illustrated in the accompanying drawing, and particularly pointed out in the appended claims, but I desire it to be understood that various changes in the form, proportions, size and minor details of construction may be made without departing from the spirit of the invention or without sacrificing any of the advantages thereof.

In order to enable others skilled in the art to which my invention pertains to make and use the same I will now proceed to describe it referring to the accompanying drawing, in which—

Figure 1, is a perspective view of a mop squeezer embodying the invention showing a portion of one of the walls of the receptacle broken away to disclose the manner of connecting the squeezing members to one another. Fig. 2, is a detached perspective view of a portion of the movable squeezing member showing the manner in which it is constructed. Fig. 3, is a sectional view of a portion of the vessel and parts of the squeezing members constructed as shown in Fig. 1. Fig. 4, is a perspective view of a modified form of the stationary squeezing member showing it detached from the receptacle.

Corresponding numerals of reference refer to like parts throughout the different views of the drawing.

The reference numeral 7, designates a vessel or receptacle which may be made of any suitable size, form and material, but preferably of the shape shown, that is substantially rectangular in form, and may be provided with a bail 8, for convenience in moving it from one place to another. Located vertically in the vessel 7, and extending from one wall thereof to another is a partition 9, or rigid squeezing member which has at each of its edges a perforated flange 10, to rest against the inner surfaces of the walls of the vessel to which they may be secured by means of rivets passed through the openings in said flanges and engaging the vessel walls. As shown in Figs. 1 and 3, of the drawing, the flanges 10, are bent at right angles to the partition or squeezing member 9, and each has its lower portion bent inwardly and downwardly as at 11, to furnish a better bearing for the pivotal shaft of the movable squeezing member as will be presently explained.

In the construction shown in Fig. 1, the partition or rigid member 11, is preferably made of sheet metal and extends downwardly to near the bottom of the vessel, but a partition or rigid squeezing member of the construction shown in Fig. 4, may be employed, which modified construction consists of two uprights 12, each of which is formed of a single piece of material folded or bent back upon itself as shown, and each has in its ends openings 13, through which rivets may be passed to secure said uprights to the inner surfaces of the walls of the vessel. The inner portion of each of the uprights 12, is bent outwardly near each of its ends as at 14, thus causing the portion interposed between the bends 14, to be held at a slight distance from the inner surface of the outer portion of each of said uprights. The said distanced inner parts being provided with a series of openings 15, to receive rods 16, which unite the uprights 12, together and are disposed horizontally thereon, and when this modified form of partition or rigid squeezing member is in position within the vessel, said rods will be disposed horizontally with respect to the same. In the lower portion of each of the uprights 12, is formed an opening 17, in which the pivot-shaft or axle 18, of the movable squeezing member, which is indicated as a whole by the reference numeral 19, is journaled. This movable squeezing member includes two horizontally disposed members 20 and 21, each of which is folded or bent back upon itself as is clearly shown in Fig. 2, of the drawing, so as to form substantially U-shaped members in cross section. Each of the members 20 and 21, has near each of its ends transverse openings 22, which are formed in both layers of each of said members and said openings are for the reception of rods 23, which have their ends riveted or otherwise rigidly secured in said openings so as to hold the members 20 and 21, apart and against collapsing. The inner portion of each of the members 20 and 21, is provided with a series of openings 24, which are for the reception of vertically disposed rods 25, the ends of which, when said rods are in place, will rest against the outer layers or portions of said members, and thereby be held in position against displacement. Located longitudinally in the loop formed by the upper member 20, of the movable squeezing member is a crank shaft 26, which has on one of its ends a crank 27, used for turning said shaft. This shaft also has near each of its ends a grooved pulley or wheel 28, of any suitable kind, and when the movable squeezing member is in position within the receptacle, said pulleys or wheels are by preference located externally of the receptacle. The axle or pivot-shaft 18, of the movable squeezing member is located longitudinally in a loop formed by the lower member 21, and when the construction shown in Fig. 1, is employed the ends of said shaft or axle is journaled in openings in the lower portion of the flanges 10, and when the construction of the rigid partition shown in Fig. 4, is employed, the ends of said shaft or axle may be journaled in the openings 17, at the lower portion of the uprights 12, of said partition. Secured at one of its ends to each of the pulleys or wheels 28, on the handled shaft 26, is a chain or other flexible connection 29, the other end of which is secured to the receptacle near one end of the rigid partition or squeezing member.

From the foregoing and by reference to the drawing, it will be readily understood and clearly seen that by placing the mop-cloth or other article, from which it is desired to extract or squeeze water, between the rigid squeezing member and the movable squeezing member when by turning the handle 27, the latter will be caused to approach the rigid squeezing member, and thus clamp and press the cloth or fibrous body with the result that the water will be squeezed therefrom and allowed to fall into the lower portion of the vessel.

By employing a squeezing apparatus or device constructed according to my invention, it is obvious that great pressure between the clamping members 9 and 19, will be afforded, and by the reason of the novel construction of the various parts of the device, it can be cheaply manufactured, easily assembled, and will be strong, durable and efficient in operation.

Having thus fully described my invention what I claim as new and desire to obtain by Letters-Patent is—

1. A mop or cloth squeezer consisting of a vessel, a squeezing member pivoted at its lower portion between the walls of said vessel, a shaft extended across the upper portion of the vessel, a wheel on said shaft near each of its ends, a crank handle on said shaft, and flexible means connecting each of the wheels to a support.

2. A mop or cloth squeezer consisting of a vessel, a squeezing member located between the walls of the vessel, a movable squeezing member pivoted at its lower portion in combination with the first named squeezing member, a shaft carried by the movable squeezing member, a wheel on said shaft near each of its ends, a crank handle on said shaft, and flexible means connecting each of said wheels to the vessel.

3. A mop or cloth squeezer consisting of a vessel, a squeezing member located between the walls thereof, a movable squeezing member pivoted at its lower portion in combination with the first named squeezing member, a shaft mounted across said vessel, a wheel on said shaft near each of its ends, a crank handle on said shaft, and flexible connections united at one of their ends to each of said wheels and at their other ends to a support.

4. A mop or cloth squeezer comprising in its construction a vessel, a squeezing member consisting of two parallel pieces each of which is folded or bent back upon itself and has in its inner portion a series of openings, a series of rods located in said openings, and means to secure the parallel pieces against displacement with respect to one another.

5. A mop or cloth squeezer comprising in its construction a vessel, an upright squeezing member located between the walls of said vessel, a movable squeezing member consisting of a pair of pieces disposed in parallelism with one another and each folded or bent back upon itself, the inner portion of each of said members being provided with openings, a series of rods located in said openings, a rod connecting said parallel pieces together near each of their ends, a pivot-shaft mounted on the lower parallel piece of said member and journaled between the walls of the vessel, alongside the lower portion of the first named squeezing member, a crank shaft mounted on the upper parallel piece of the movable member, a crank handle on said shaft, a pulley or wheel on the crank shaft, and a flexible connection united at one of its ends to said pulley or wheel and at its other end to the vessel.

NETTIE HILKER.

Witnesses:
PAUL R. ESCH,
GRACE HARRISON.